United States Patent [19]

Förster et al.

[11] 4,364,726
[45] Dec. 21, 1982

[54] CERAMIC BURNER HEAD WITH SEPARATE FUEL AND OXIDIZER PASSAGES

[75] Inventors: Siegfried Förster, Alsdorf; Manfred Kleemann, Bergheim; Berthold Sack, Aachen, all of Fed. Rep. of Germany

[73] Assignee: Kernforschungsanlage Jülich GmbH, Jülich, Fed. Rep. of Germany

[21] Appl. No.: 100,634

[22] Filed: Dec. 5, 1979

[30] Foreign Application Priority Data

Dec. 9, 1978 [DE] Fed. Rep. of Germany ....... 2853309

[51] Int. Cl.³ .............................................. F23D 11/44
[52] U.S. Cl. .................................... 431/215; 431/181; 239/418; 239/555; 165/166; 60/39.51 R; 432/223
[58] Field of Search ............... 431/215, 216, 217, 164, 431/181, 346; 165/166; 239/418, 568, 555; 432/223; 60/39.51 R

[56] References Cited

U.S. PATENT DOCUMENTS

| | | | |
|---|---|---|---|
| 3,307,612 | 3/1967 | Stack | 239/555 |
| 3,556,701 | 12/1968 | Momoda et al. | 431/181 |
| 3,615,054 | 10/1971 | La Botz | 239/555 |
| 3,978,660 | 9/1976 | Laing | 60/39.51 R |
| 4,081,136 | 3/1978 | Addams et al. | 239/418 |
| 4,298,059 | 11/1981 | Krauth et al. | 165/166 |

*Primary Examiner*—Samuel Scott
*Assistant Examiner*—Lee E. Barrett
*Attorney, Agent, or Firm*—Karl F. Ross

[57] ABSTRACT

A burner head of ceramic materials through which the fuel (combustible) and the oxidizing agent (oxygen or oxygen-containing gas such as air) are passed from an inlet side to an outlet side, combustion being effected at the outlet side. According to the invention, the gas passages for the fuel and the oxidizing medium are of elongated cross section and parallel to one another, being offset in pairs so that indirect heat exchange is effected between the two mediums through the separating ceramic wall. The passages can be formed as rectangular-section channels which are closed at the top and bottom by ceramic plates.

7 Claims, 8 Drawing Figures

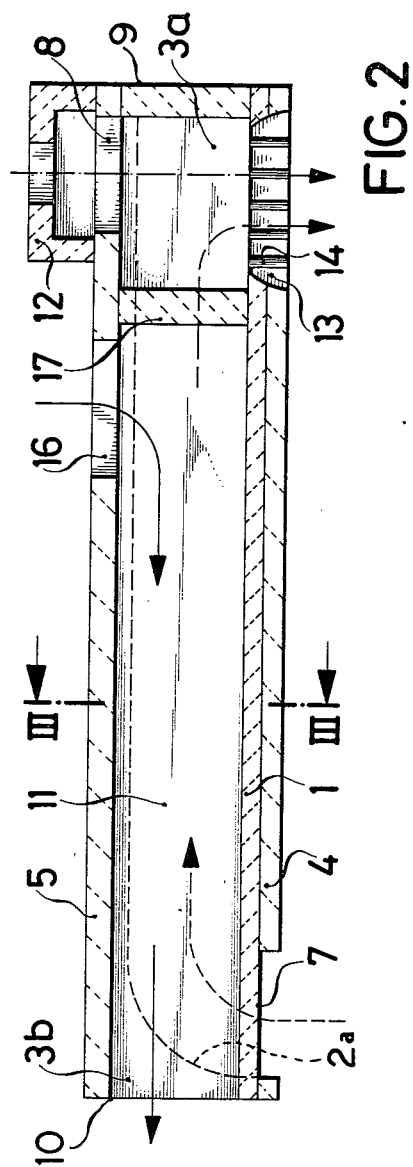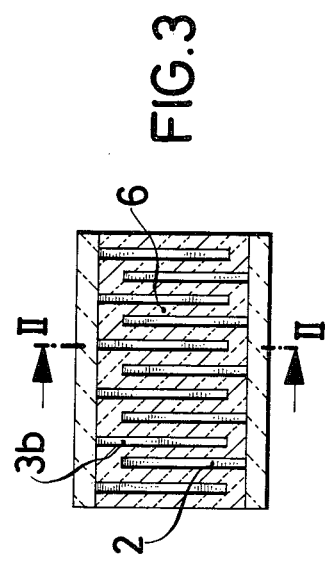

CERAMIC BURNER HEAD WITH SEPARATE FUEL AND OXIDIZER PASSAGES

FIELD OF THE INVENTION

Our present invention relates to a ceramic burner head of the type in which a combustible fluid, generally referred to as a fuel, and an oxidizing agent (generally oxygen or an oxygen-containing gas such as air or oxygen-enriched air), sometimes referred to hereinafter as an oxidizer, are supplied through separate passages to an outlet end of the burner head at which combustion occurs. More particularly, the invention relates to a burner head having parallel and mutually adjacent passages for the fuel and combustion-sustaining agent in a ceramic body whose discharge end opens into the combustion chamber.

BACKGROUND OF THE INVENTION

Ceramic burner heads having passages through which the fuel and combustion-sustaining agent, both generally in gaseous form, as fed can be used as fluid heaters are described, for example, in German patent document (printed application-Auslegeschrift) DE-AS No. 23 47 934. In this burner head combustion air is distributed by a manifold to passages perpendicular to the air flow while a plurality of parallel flow passages conduct the combustion gas (fuel) through the burner head, the system being so constructed that directly ahead of the entry of the fuel gas to the combustion chamber, mixing of the fuel with the combustion air occurs.

Such burner heads are relatively costly especially when the passages for the combustion air are enlarged to ensure a uniform distribution of the fuel gas in the oxidizing agent and hence a broad combustion front.

A burner head for high outputs is described in German patent document (printed application-Auslegeschrift) DE-AS No. 20 44 813. In this head a plurality of parallel flow passages for the fuel gas and the oxidizing medium are disposed adjacent one another so that the flow passages for the oxidizing medium are surrounded by the flow passages for the fuel. It is difficult and complicated to provide this system with the manifolds necessary to distribute the fuel gas and combustion-sustaining gas to the respective passages. Thus, while the supply of the oxidizing agent can be effected through a distribution chamber, the connections for the flow passages for the fuel must be specifically provided in complex and precise configurations, thereby rendering the mounting, assembly and repair costs prohibitive.

High outputs, moreover, require a preheating of the oxidizing agent and the fuel gas. Thus in German patent document (open application-Offenlegungsschrift) DE-OS No. 27 06 043, the gas mixture of the fuel gas and the oxidizing agent, prior to entry into the combustion chamber, and contacted with a recuperative heat carrier whose temperature is raised by contact with the exhaust gases discharged from the combustion chamber.

The literature also describes, see German patent document (open application-Offenlegungsschrift) DE-OS No. 24 08 542, a preheating of the combustion air before it is mixed with the fuel gas in a system in which the combustion air acts as a coolant for metal walls of the combustion chamber. While this system provides an increased efficiency it is frequently desirable to heat the fuel gas as well before it is mixed with the oxidizing agent or medium.

OBJECTS OF THE INVENTION

It is the principal object of the present invention to provide an improved high-efficiency high-output burner head of ceramic materials for the combustion of a fuel gas with an oxidizing medium and which permits preheating of both fluids while nevertheless facilitating distribution of the fluid to the passages of the burner head and ensuring a wide combustion front.

Another object of the invention is to provide an improved burner head of the type described which has a particularly effective turbulent mixing of the two fluids at the outlet to produce the ignitable mixture and which can effect a high efficiency preheating of both fluids in a similar manner.

Yet another object of the invention is to provide a multi-passage ceramic burner head which is of relatively low cost.

SUMMARY OF THE INVENTION

These objects and others which will become apparent hereinafter are attained, in accordance with the present invention, in a ceramic burner head for the separate supply of fuel gas and an oxidizing agent to a combustion chamber via a plurality of mutually parallel and adjacent passages opening into the combustion chamber for the gas and combustion-sustaining fluid, wherein the flow passages have an elongated cross section (preferably rectangular with the length of the cross section being many times greater than the width) with the flow cross sections being closed by cover plates or walls forming part of the burner head and the flow passages being offset from one another so that a partition is formed in the burner body between each pair of neighboring passages to enable indirect heat exchange between the oxidation agent and the fuel gas.

According to a feature of the invention, the burner head is so constructed and arranged that passages through the cover plates are provided for the various slot-like flow channels whereby a portion of the burner head is constituted as a heat exchanger between the oxidizing fluid and the combustion exhaust gases whereas another portion of the burner head permits the heat exchange between this fluid and the fuel gas.

An important aspect of the present invention is that the flow passages of the burner head have elongated cross sections, i.e. that the flow cross section of each passage taken in a plane perpendicular to the flow direction is elongated and generally slot- or slit-like. This allows the partitions or walls between the flow passages for the fuel gas and the combustion-sustaining gas to be relatively thin and to provide a relatively large heat-transfer surface for indirect heat exchange between the adjacent flow passages. Furthermore, since these flow passages can open in a common plane into the combustion chamber at corresponding slit-like openings, an excellent mixing of the two fluids and a uniform interdistribution of them can be assured.

The burner output can be controlled readily over a wide range by fine control of the volume rates of flow of the fuel gas and the combustion-sustaining fluid because the relatively slender flow cross sections have been found to bring about effective mixing and heat exchange over corresponding wide ranges of flow rates.

Another advantage of the system of the present invention is that the fuel gas is preheated by the oxidizing agent, an advantage which has been found to be of particular interest when the fuel is initially a liquid and is vaporized in whole or in part by this heat exchange prior to its admission into the combustion chamber.

The flow passages for the oxygen-containing gas and the fuel can be formed in a unitary body of ceramic which is provided with slits open along opposite broad faces of this body so that these slits are closed along these faces by the ceramic cover plates mentioned heretofore. The flow passages thus have common partitions or walls which promote heat exchange between the fluids and, in addition, the slit-like passages facilitate connection of the supply chambers to the passages since the passages have one set of fluid passages that open through the cover plate on one side of the body while the other set of passages for the other fluid can be provided in the other cover plate and can communicate between the second chamber and the slits for this second fluid.

According to a feature of the invention, which facilitates the separate supply of the fluids to the respective sets of slit-like flow passages, each of the flow passages is closed by a respective cover plate and extends the full length of the body to communicate over only a portion of its length with a window in the cover plate affording communication with this flow passage and the flow passages for the same fluid opening at the same side of the body and partially closed by the same cover plate.

All of the throughgoing passages of one set may be closed by a further plate so that this set of passages can be used for two distinct fluids and flow paths, e.g. the flow of the exhaust gas and fuel gas along respective paths.

In this manner the burner head can be formed as two heat exchangers, one of which serves to preheat the combustion-sustaining gas while the other serves to heat the fuel by transfer of the heat from the combustion-sustaining gas. In this case, it has been found to be desirable to provide an inlet for the combustion-sustaining gas through the cover plate for the associated flow passages at an end of the burner head remote from the combusion chamber, partitions for the other flow passages close to the end of the burner head proximal to the combustion chamber, an inlet in the cover plate for the latter flow passages between these partitions and the distal end of the burner head so that combustion gases can be passed in counterflow and heat exchanging relationship to the combustion-sustaining gas, the yet another opening in the latter cover plate on the opposite side of these partitions for the fuel gas. The outlets for the fuel gas and oxygen-containing gas passages can be provided in the first-mentioned cover plate.

The preheating portion of the burner head thus forms a recuperative heat exchanger through which the heating medium, especially combustion waste gases, pass in counterflow to the oxygen-containing gases for heat transfer through the intervening walls.

The combustion gases, according to another feature of the invention, can be so conducted that they drive a turbine, prior to entry into the preheater, the turbine serving to drive a compressor to draw the oxygen-containing gas into the burner head.

In accordance with another aspect of the invention, a burner head is provided which is composed of ceramic material and is formed with alternate passages of elongated cross section separated by ceramic walls through which heat exchange can be effected, alternate passages being grouped in respective sets. The burner head is formed with an inlet and an outlet for one of these sets such that a fluid passing between the inlet and the outlet traverses the full length of the ceramic body while partitions are provided intermediate the lengths of the passages of the other set so that a second fluid can be passed in heat exchanging relationship with the first-mentioned fluid over a portion of the path of the latter while a third fluid is passed in heat exchanging relationship with the first over the remaining portion of the path of the latter.

BRIEF DESCRIPTION OF THE DRAWING

The above and other objects, features and advantages of the present invention will become more readily apparent from the following description, reference being made to the accompanying drawing in which:

FIG. 2 is a cross-sectional view of a modification of the burner head of FIG. 1 provided with a preheating zone for the combustion-sustaining gas and a lateral outlet for the fuel and combustion-sustaining gas, the view being taken along the line II—II of FIG. 3;

FIG. 3 is a cross-sectional view taken along the line III—III of FIG. 2;

SPECIFIC DESCRIPTION

Figure 1:
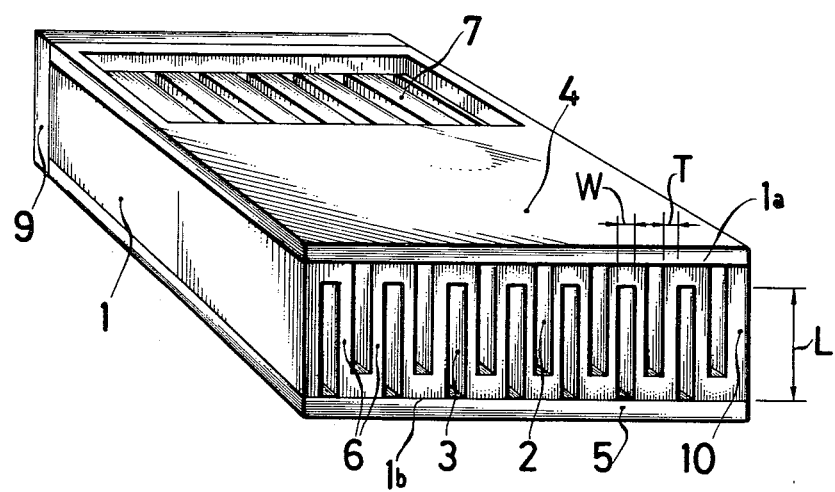
FIG. 1 is a diagrammatic perspective view of a burner head embodying the present invention.

FIG. 1 shows a burner head in a simplified form which can be used in burner nozzles or burner assemblies for a wide variety of applications particularly for the firing of air heaters, liquid heaters, steam generators and the like. A multiplicity of the units shown can be assembled to form a burner and the resulting burner can open into a combustion chamber in any conventional manner. When a plurality of these units is assembled to form a burner assembly, the array can be annular, polygonal, stacked, etc.

The burner head comprises a one-piece ceramic block 1 of rectangular configuration having broad surfaces 1a and 1b at which respective flow passages 2 and 3 open. The surfaces 1a and 1b are covered by ceramic plates or walls 4, 5.

The passages 2, 3 are formed as slits extending parallel to one another and longitudinally of the block. As a result, they have elongated cross sections shown to be rectangular in FIG. 1 with a cross-sectional length L which can be many times the cross-sectional width W. Preferably L can range between 10W and 50W.

W can have a dimension between 0.5 and 2 mm, preferably about 1 mm while the partitions 6 between adjacent flow passages 2, 3 can have thicknesses T as small as 0.3 mm and which may range from substantially 0.3 to 2 mm.

The linear slits form the respective flow passages for the fluids which undergo heat exchange through the wall between them.

The cover plate 4 may be cut away as shown at 7 to provide a window communicating with the slits 2 and capable of delivering air to the latter slits. The air, in the simplified embodiment of FIG. 1, may be preheated externally of the burner head.

A corresponding cutout (not shown) in the lower plate 5 can communicate with the slits 3 to feed the fuel gas to these slits so that the fuel gas is preheated by indirect heat exchange through the wall 6 with the heated oxygen-containing gas.

Since the rear end of the block 1 is closed at 9, thin layer-like streams of gas emerge at the open end 10 of the burner head and are intimately mixed and distributed within the combustion chamber into which the end 10 opens.

In the Figures described below, corresponding reference numerals will be used to refer to corresponding elements, even for more complex burner head structures.

In general, the cover plate or walls 4, 5 are so cut away that respective sets of slits can communicate with respective chambers for distributing the fluids to the flow passages formed by these slits, a typical chamber of this type being represented in FIGS. 2 and 3. The opposite opening direction of the slits, i.e. at the surfaces 1a and 1b have alternate slits, and the resulting offset of adjacent slits, permits communication with the respective sets of slits in a particularly simple and convenient manner.

As the fuel gas and the combustion-sustaining gas emerge at the end 10 of the burner head that form an ignitable gas mixture, the flame zone is such that the heating of the head by the flame is minimal. The temperature of the burner head, therefore, is substantially the temperature of the oxygen-containing gas.

FIGS. 2 and 3 show an embodiment of the invention in which the burner head has a preheating zone and a heat transfer zone for the setting of the fuel gas as well. The preheating zone is represented at 11 and is formed as a recuperative heat exchanger.

In this embodiment, the downwardly-open slits or flow passages 2 communicate with a window 7 through which oxygen can be drawn through these passages as represented by the broken-line arrow shown in FIG. 2. The upwardly-open slits 3, however, are provided with partitions 17 which subdivide these slits into two flow passages each. The bottom plate 4 is formed with a lateral outlet window 13, provided as slots 14 or the like so that the air flows outwardly in sheets or layers.

In this embodiment, the chamber 12 communicates through a window 8 in the upper plate 5 with the upwardly-open slits 3 in the regions 3a beyond the partition 17 so that the fuel gas passes through the slits 3a in the direction of the dot-dash arrow shown in FIG. 2. In this embodiment the end face of the burner head is closed at 9. Each of the flow passages formed by slits 2 is closed at its left-hand end by a guide wall 2a also illustrated in FIG. 2. The guide wall 2a, the body 1 and the members 9 and 17 may be provided unitarily with other parts of the block 1 by a ceramic-molding process.

The flow passages 3b of the slits 3 on the left-hand side of the partition conduct combustion exhaust gases (solid line arrows in FIG. 2) from an opening 16 in the top wall 5 to discharge the exhaust gas at the end face 10 of the embodiment shown in FIG. 2. The window 16 thus communicates between the interior of the combustion chamber and the passages 3b.

The oxygen-containing gas thus passes in indirect recuperative heat exchange in counterflow to the hot exhaust gases through the preheating zone 11 to thereby heat the oxygen-containing gas a portion of the heat of the latter being transferred to the fuel which traverses the passages 3a which are aligned with the respective passages 3b but are sealed in a gas-tight manner from the latter by partitions 17.

Figure 4:
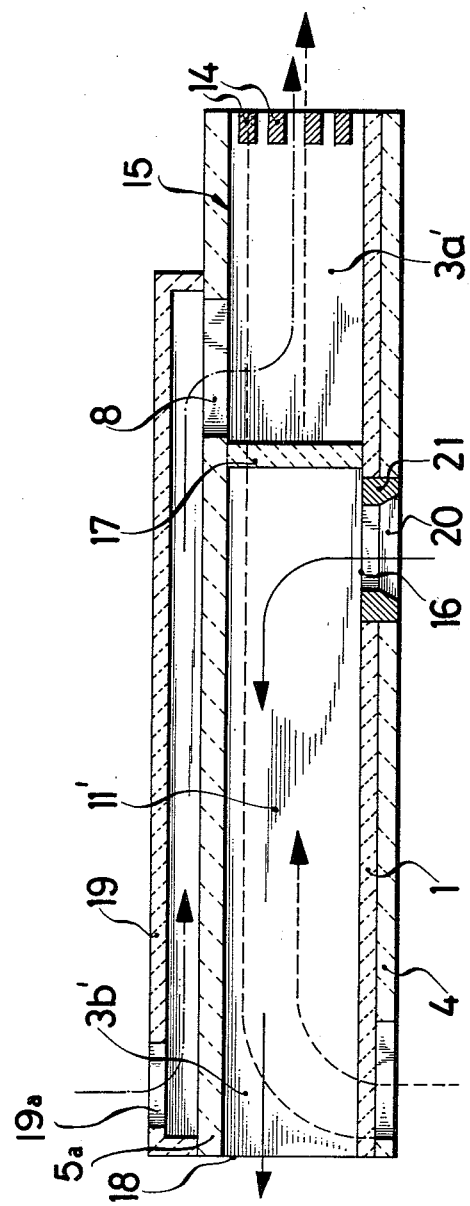
FIG. 4 is a view similar to FIG. 2 showing a burner head with a preheating zone and an end discharge for the two components to form the combustible mixture.

A burner head with a longer heating zone for the fuel gas has been shown in FIG. 4. In this embodiment, the window 8 in the upper plate for the fuel gas is spaced from the inlet 19a of the flat-fuel-discharging chamber 19 provided upon the plate 5a which covers the top of the block 1. In this case, the flow passages 3a' are longer than the passages 3a while preheating is effected in the preheating zone 11 via the exhaust-passages 3b in the manner previously described. The system shown in FIG. 4 heat been found to be desirable not only because some heat exchange takes place through the cover 5a but also because the longer heating zone 15 permits vaporization of liquid fuels.

The rear end of the burner head shown at 18 can communicate with a duct for carrying away the exhaust gas and, if desired, a system for feeding the fuel to the chamber 19. The combustion gas is supplied through feed openings 20 formed with a distributor 21 and disposed in the window. The latter window is provided in the cover plate 4 underlying the block 1.

Figure 5:
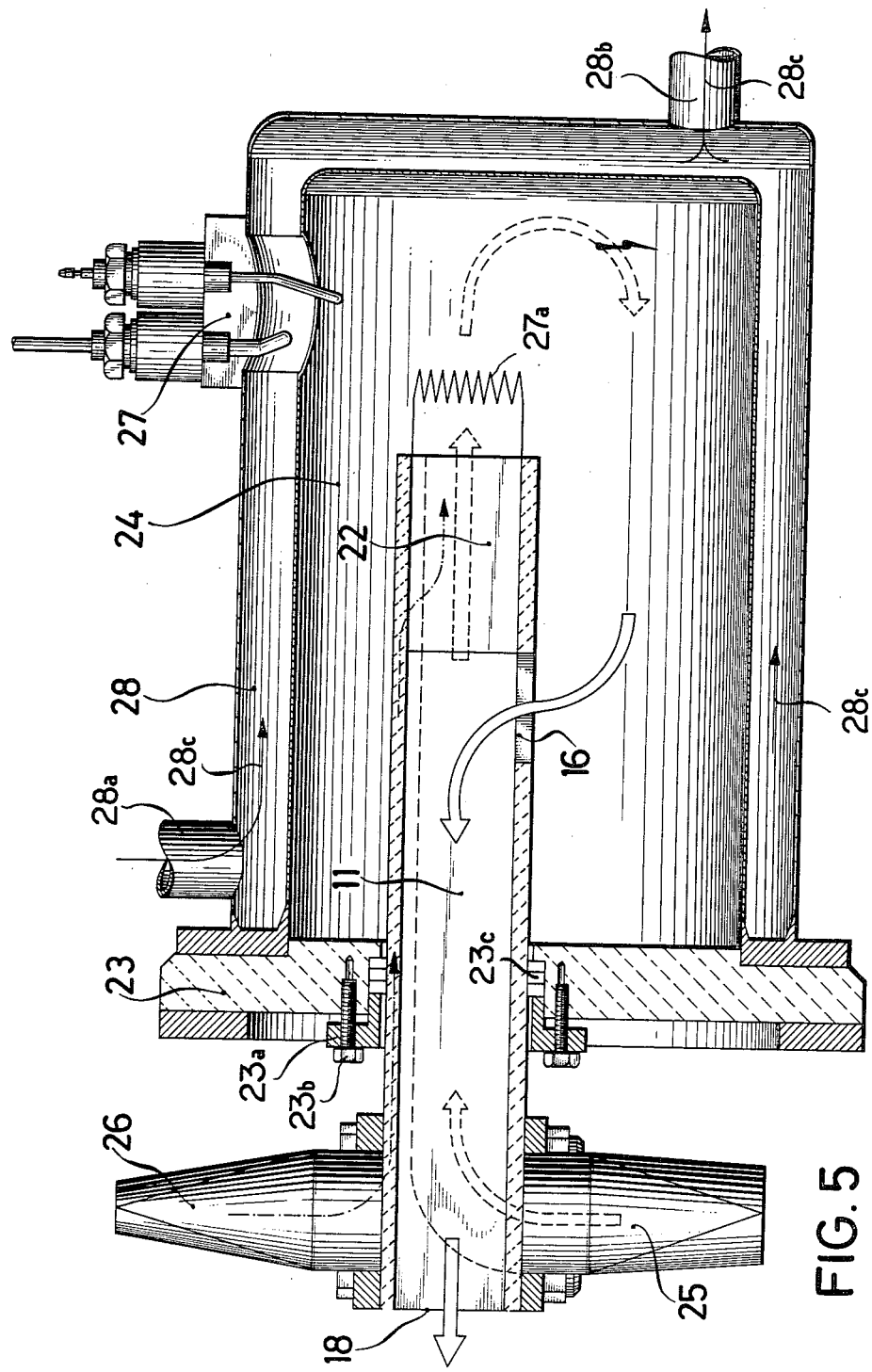
FIG. 5 is a diagrammatic cross-sectional view showing a fluid heater using a burner head in accordance with the present invention.

FIG. 5 shows an embodiment of the invention in which the burner head 22, which can be generally similar to that described in connection with FIG. 4, is built into a heater for a fluid, e.g. air, water or steam.

The burner head 22 is fitted into an end plate 23 of the heater in which it is held by a clamp 23a via bolts 23b and packing bodies 23c.

The burner head 22 projects into the combustion chamber 24 sufficiently far that its inlet opening 16 for the exhaust gas can draw the combustion gases from the heater.

When the latter is formed as a boiler, the chamber 24 can be defined by pipes 28 communicating with a feed water line 28a or downcomer, the hot water or steam being discharged through an outlet as represented by the arrows 28c.

The exhaust gases pass through the preheating zone 11 of the burner head and are discharged at 18 to a stack or the like.

The oxygen-sustaining fluid is air which is fed through an inlet 25 and the previously described opening 7 (FIG. 2) from a blower or the like not shown. The fuel gas is supplied via line 26 to the opening 19a of the burner head (see FIG. 4).

In the region of the gas mixture an igniter 27, e.g. of the spark type, can be provided.

Figure 6:
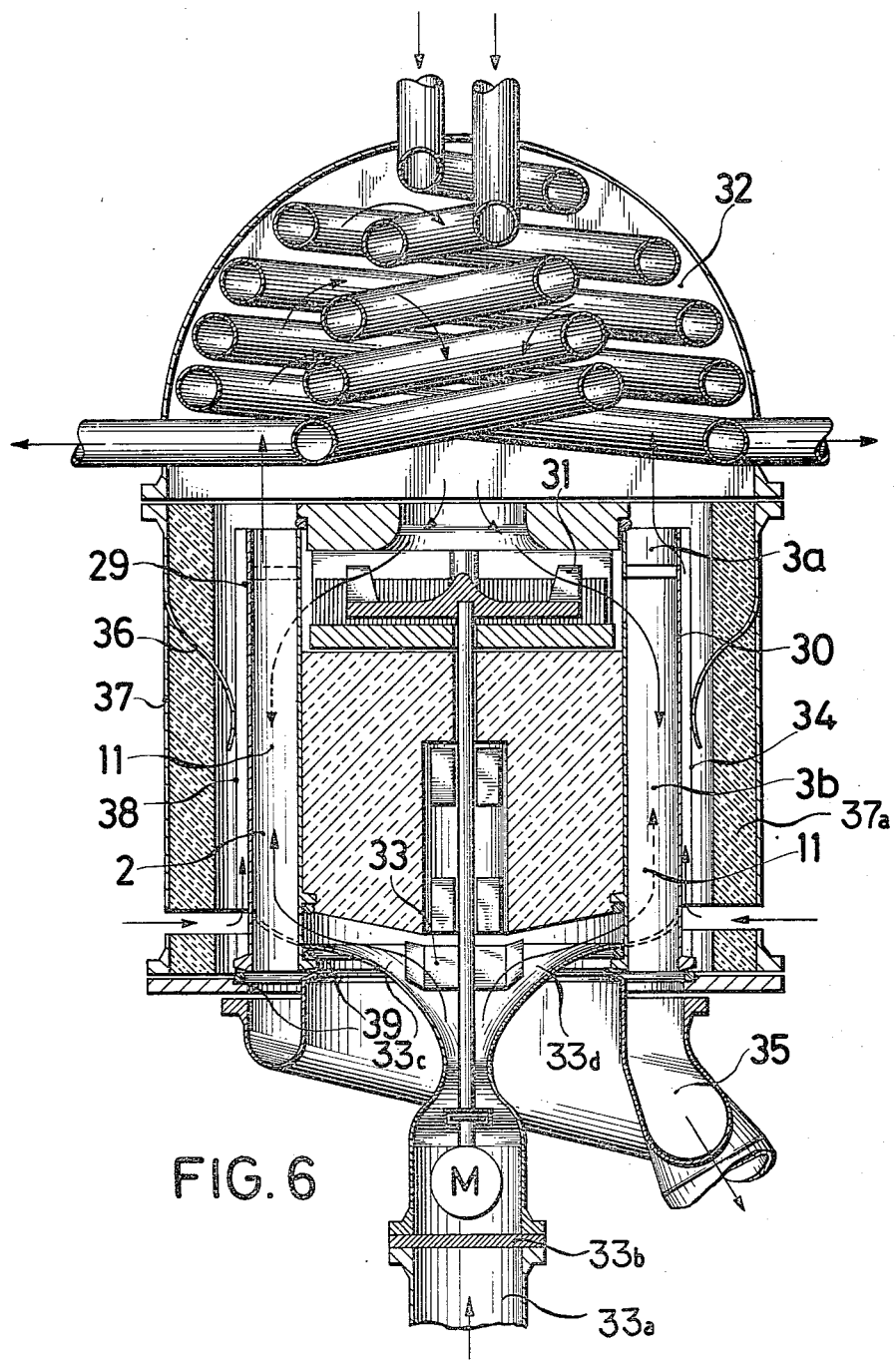
FIG. 6 is another diagrammatic cross-sectional view of a heater utilizing a plurality of burner heads arrayed in a ring and a combustion gas driven turbine to drive an air compressor.

Another example of a heater in accordance with the present invention has been shown in FIG. 6. In this heater a plurality of burner heads, two of which are seen at 29 and 30, are disposed in a ring pattern about the axis of the heater along which a turbine 31 extends. The turbine 31, journaled for rotation about the axis surrounded by the burner heads 29, 30, but extending parallel thereto, is driven by the exhaust gas passing out of the combustion chamber 32 before the exhaust gas enters the preheating zones 11 of the burner heads 29, 30, etc.

The turbine 31 is coupled to a blower or fan 33 which induces air into the system through a duct 33a and a filter 33b, the air being fed via branches 33c, 33d, etc., to the heads 29, 30, etc., which can be of the type described in connection with FIG. 4.

In FIG. 6, the left-hand side of the apparatus is cut through the oxygen passage, i.e. the passage 2 of the burner 29, while the cut through the burner head 30 on the right-hand side of the apparatus is taken through the flow passages 3a and 3b for the fuel gas introduced through inlet 24 and the exhaust gas flowing out of the turbine 31. An exhaust gas duct 35 discharges the exhaust gas to a stack or the like.

The burner heads 29, 30 of the heater of FIG. 6 are held in place by spring elements 36 fixed to a housing 37 surrounding the burner heads and lined with thermal insulation 37a. The burner heads, being pressed inwardly, abut one another and are engaged by the springs 36 at their faces 38 turned toward the housing 37.

For gas-tight sealing of the burner heads 29, 30, etc., sealing elements 39 are provided where these heads meet the respective ducts.

Figure 7:
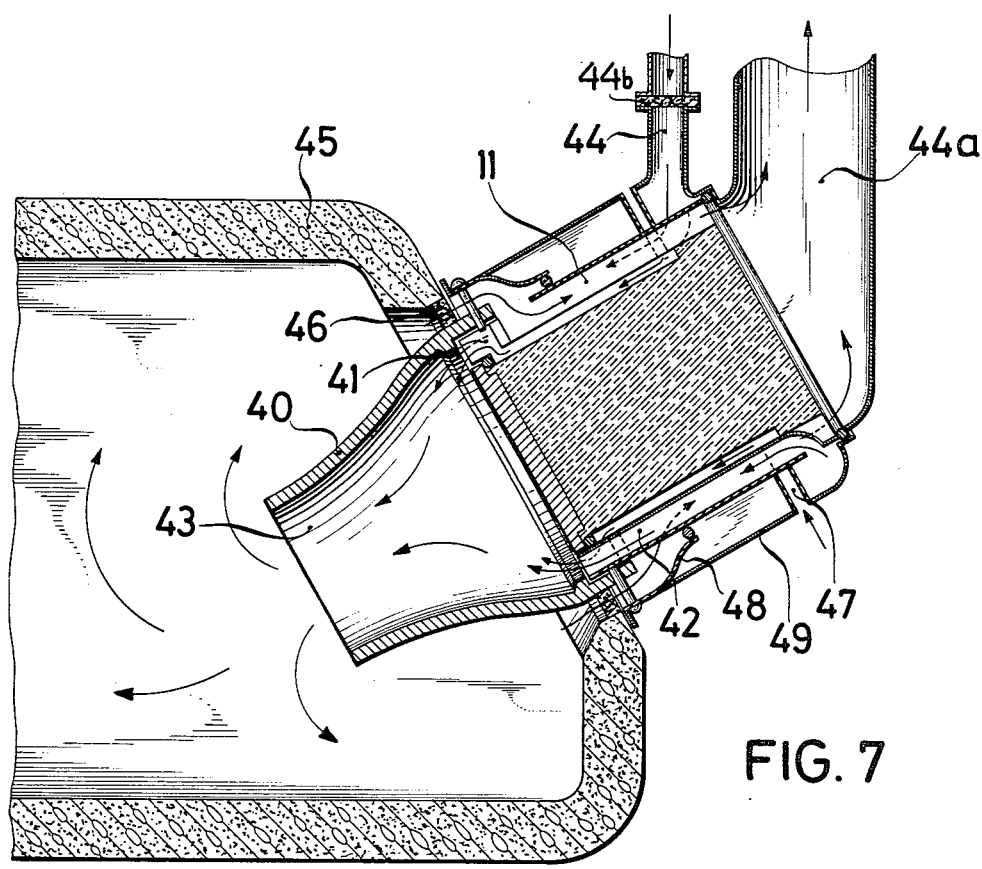
FIG. 7 is a cross-sectional view, also in somewhat diagrammatic form, of a burner nozzle containing burner heads according to the invention.

FIG. 7 shows an embodiment of the invention in which a burner nozzle 40 is provided with opposing burner heads represented at 41 and 42, and opening into the combustion chamber 43 of the nozzle in the same manner as the burner heads of FIG. 6 open into the combustion chamber thereof.

For preheating of the combustion-sustaining air and therefore, of the fuel gas, a duct 44 is provided to lead the combustion-sustaining gas (air) past the filter 44b, to the windows 7 (not shown) of the burner heads. The furnace 45 is represented diagrammatically and has, surrounding the nozzle, a filter 46 through which the exhaust gas is drawn through the preheater 11 to pass in counterflow and indirect recuperative heat exchange to the combustion air. The fuel is fed via ducts 47 to the burner heads, An outlet 44a is provided for the waste gases.

The burner heads 41 and 42 are held in place by an all-around closed spring element 48 which is fastened on the housing 49 and is designed to seal against the inflowing air 44. Sealing elements can be provided as are necessary in the manner previously described.

Figure 8:
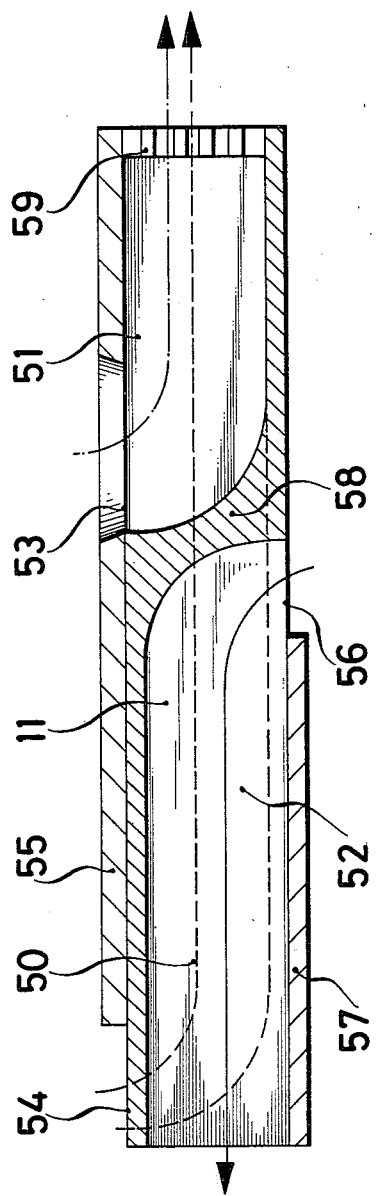
FIG. 8 is a view similar to FIG. 4 illustrating another modification of a burner head in accordance with the present invention.

FIG. 8 shows a burner element modification in which the flow passage 52 for the fuel gas and the preheating exhaust gas are separated by a barrier 58 along the same slit while the combustion air traverses the adjacent slit which, in cross section, has the configuration of FIG. 3. In this embodiment, the oxygen-containing gas and the fuel gas are introduced on the same side of the ceramic body while the combustion-sustaining gas is delivered on the opposite and is discharged through the left-hand end of the burner.

The preheating zone 11 is here of a length corresponding generally to the fuel-heating zone and the right-hand or discharge end of the body in the gas channel is provided with formations 59 to assure uniformity of the discharge of the fuel gases.

The inlets for the oxygen-containing gas and fuel gas are thus at the same level and parallel to one another with only the passages 52 for the heating medium offset from the others.

The inlets 53 for the fuel gas and 54 for the combustion air are cutouts at two locations for the wall 55 closing the passages 50, 51 while the window 56 for delivering the combustion gas to the preheating zone is a cutout of the wall 57.

The burner head of FIG. 8 corresponds generally to the burner heads previously described and can be used in similar applications. The flow passage 50 for the oxygen-containing air extends practically linearly over the full length of the burner from the preheating zone 11 until the air is discharged through the slots at the mouth of the burner head into the combustion chamber. The flow passages 51 for the fuel gas and 52 for the heating medium are aligned and separated only by the parittion 58 in each slot. The grid or guide members 59 can constrict the cross section of flow passages 51 to obtain uniform gas exit at the burner mouth.

The ceramic burner heads of the present invention can be produced by grinding or milling slots in ceramic bricks or blocks, e.g. from opposite sides. The cover plates can be cemented in place and cut away to form the gas inlet openings or can previously be provided with such openings and then applied to the ceramic block. When the block has a closed end, a plate can be applied thereto or the closed end can be cemented over and flow guide members can be provided at the mouth of the burner head to constrict the fuel gas passages. The entire burner head can then be fired to ensure its structural stability.

The ceramic burner heads of the present invention have been found to be able to preheat the combustion air to temperatures up to and in excess of 800° C. so that the system can be operated with high air excess to achieve especially high temperatures. When, of course, the combustion air can be preheated to temperatures below 800° C. within the permissible limits of the apparatus, the burner head can be composed in whole or in part of metal, e.g. refractory metal sheet which can be folded into the configuration of the slots and passages previously described. This is especially the case for the portion of the burner head in which heat exchange between the combustion air and the fuel gas is effected. The resulting metal plates can have a meandering configuration.

We claim:

1. A ceramic burner head comprising
an elongated ceramic body formed with at least two sets of longitudinally extending interleaved and staggered flow channels extending parallel to each other with the channels of one set off-set from the channels of the other set toward opposite sides of said body whereby partitions of the ceramic material of said body separate adjacent channels of the two sets and the channels of the sets alternate with one another, said channels opening substantially in a common plane at an end of said body to discharge respective fluids into a combustion chamber;
respective cover plates along said sides of said body for closing the channels of the respective sets while being provided with windows admitting a plurality of fluids to said channels including a combustion-sustaining oxidizing agent and a fuel whereby heat exchange is effected between said oxidizing agent and said fuel through said partitions between respective channels of said sets, all of said flow channels having elongated uniform flow cross sections in planes perpendicular to the flow direction, said fuel and said agent being discharged into said combustion chamber, at least one of said plates being formed with an opening for feeding a heating medium partly through at least some of said channels as one of said fluids to preheat another of said fluids in a preheating zone of the burner head, the channels of one of said sets being subdivided into two flow passages by respective separator walls;

means for passing said fuel through one of said passages; and means for passing said heating medium through the other of said passages in a direction opposite to the flow of said oxidizing agent along adjacent channels of the other set.

2. The ceramic burner head defined in claim 1 wherein said body has a rectangular parallelpipedal configuration and said sides are broad sides of said body, each of said channels being formed as a slot open toward the respective side and at least partially closed by the respective plate, the channels being closed at least at one end of said body.

3. The ceramic burner head defined in claim 1 wherein the heating medium is combustion exhaust gas withdrawn from said combustion chamber.

4. A burner assembly comprising a housing opening into a combustion chamber, a plurality of burner heads mounted in said housing, each of said burner heads comprising:

an elongated ceramic body formed with at least two sets of longitudinally extending interleaved flow channels extending parallel to each other with the channels of one set offset from the channels of the other set toward opposite sides of said body whereby partitions of the ceramic material of said body separate adjacent channels of the two sets and the channels of the sets alternate with one another, said channels opening substantially in a common plane at an end of said body to discharge respective fluids into a combustion chamber;

respective cover plates along said sides of said body for closing the channels of the respective sets while being provided with windows admitting a plurality of fluids to said channels including a combustion-sustaining oxidizing agent and a fuel whereby heat exchange is effected between said oxidizing agent and said fuel through said partitions between respective channels of said sets, all of said flow channels having elongated uniform flow cross sections in planes perpendicular to the flow direction, said fuel and said agent being discharged into said combustion chamber; and a gas turbine in said housing driven by combustion exhaust gas for displacing air through said burner heads as said agent.

5. The assembly defined in claim 4 wherein said burner heads are disposed in an annular array.

6. The assembly defined in claim 4, further comprising springs mounted on said housing and pressing said burner heads against one another.

7. The burner head comprising a body formed with two sets of interleaved mutually parallel linear flow channels opening in a common outlet plane whereby each channel is flanked by two channels of the other set but separated therefrom by a thermally conductive wall, each of said channels being of elongated flow cross section, means in the channels of one set for partitioning same into a first flow passage terminating at said outlet and a second flow passage remote from said outlet, means for passing combustion air through the flow channels of the other set in a direction toward said outlet, means for feeding a heating medium through said second passages in the opposite direction for heating said combustion air, and means for passing a fuel gas through said first passages in said direction to said outlet for heating by said combustion air.

* * * * *